R. J. SMITH.
HOB FOR FINISHING WORM GEAR TEETH.
APPLICATION FILED SEPT. 29, 1908.
1,049,161.
Patented Dec. 31, 1912.
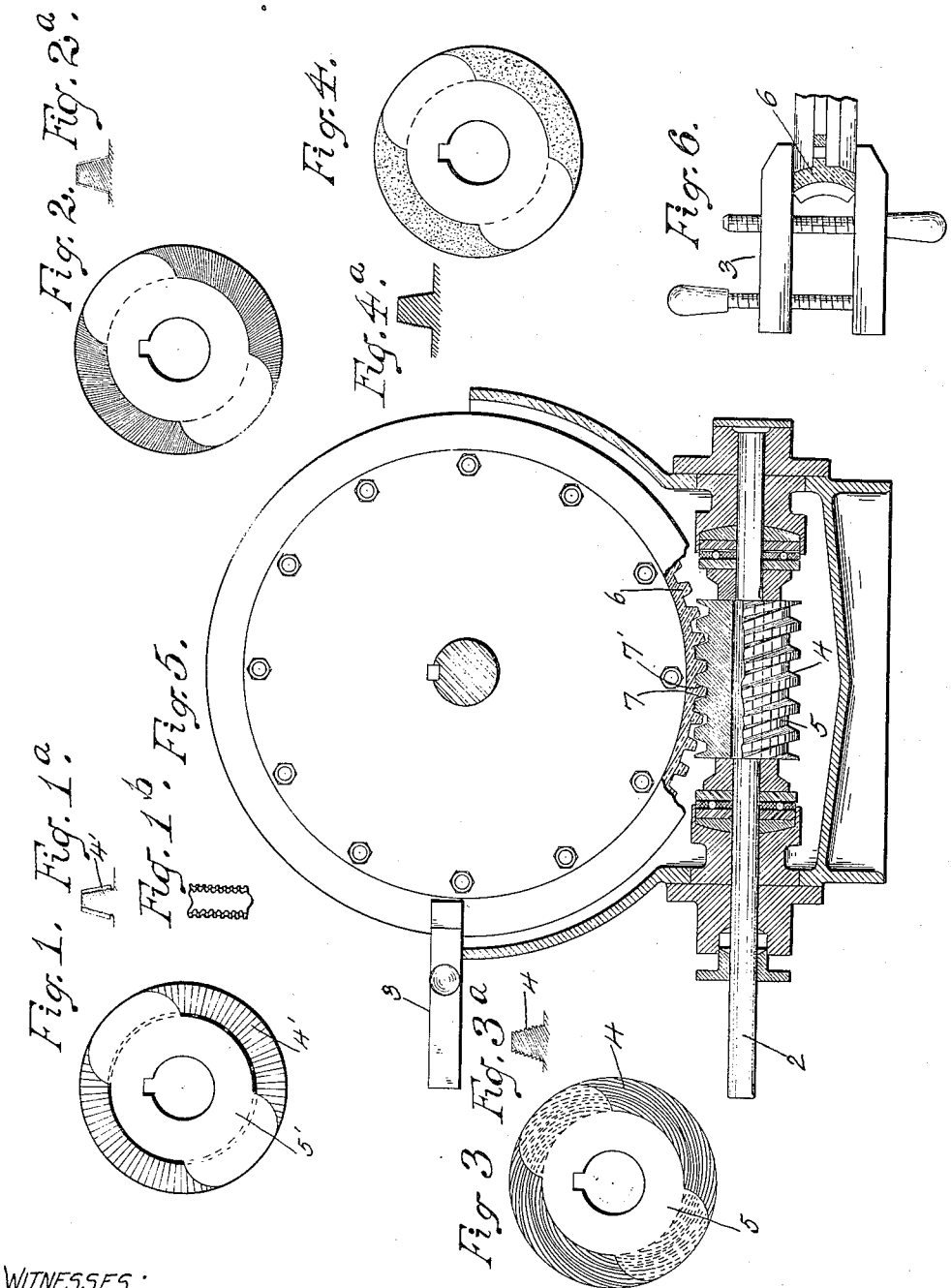
WITNESSES:
Ernest L. Gale, Jr.
James L. Bethell
INVENTOR
Robert J. Smith
BY
J. F. Rule
ATTORNEY

UNITED STATES PATENT OFFICE.

ROBERT J. SMITH, OF YONKERS, NEW YORK.

HOB FOR FINISHING WORM-GEAR TEETH.

1,049,161.  Specification of Letters Patent.  Patented Dec. 31, 1912.

Application filed September 29, 1908. Serial No. 455,287.

*To all whom it may concern:*

Be it known that I, ROBERT J. SMITH, a citizen of the United States, residing at Yonkers, in the county of Westchester and State of New York, have invented a new and useful Improvement in Hobs for Finishing Worm-Gear Teeth, of which the following is a specification.

My invention relates to gear-cutting apparatus, and one of its objects is the provision of improved mechanism for finishing the lateral faces of worm gear teeth so that they will mesh accurately with the worms with which they are to coöperate.

More particularly it is the object of the invention to provide a finishing hob having cutting edges or teeth of fixed dimensions on its inner lateral faces.

Other objects of the invention will appear hereinafter, the novel combinations of elements being set forth in the appended claims.

Referring to the accompanying drawings, Figure 1 represents an end view of a finishing hob with radial cutting teeth; Figs. 1ᵃ and 1ᵇ are detail views; Fig. 2 is an end view of a finishing hob having file teeth or inclined teeth; Fig. 2ᵃ is a detail of Fig. 2; Fig. 3 is a view of a finishing hob showing scroll-cut or involute teeth; Fig. 3ᵃ is a detail view of Fig. 3; Fig. 4 is a view of a hob, the lateral faces of which are covered with abrasive material; Fig. 4ᵃ is a detail view of Fig. 4; Fig. 5 is a view showing the finishing hob in mesh with the gear to be finished; and Fig. 6 is a fragmentary plan view of Fig. 5, to show the clamp acting as a resistance device with the rotation of the gear wheel.

Heretofore worm gears for worm gear elevators have been finished by running the same in mesh with ordinary worms in a bath of oil either with or without an abrasive material. It has been found, however, that this method is unsatisfactory, as it takes several days to finish a worm gear of average size, and even then the gear and worm do not mesh properly. To overcome this objection, I have provided a finishing hob or cutting tool comprising a worm, preferably of hard and tempered steel, having lateral cutting edges or teeth of fixed dimensions and properly shaped to have the correct surface to fit the worm wheel to be finished. By applying this tool or hob to a worm wheel or gear after the worm wheel or gear has been roughed out in a hobbing machine, I can finish the lateral surfaces of the teeth of a worm wheel or worm gear so as to make a much more accurate fit with the worm with which it is to be used than when the worm gear is finished in a bath of oil and abrasive material. Besides, I can by the use of such a hob perform the finishing operation in a very short time. It should also be noted that the cutting hob for cutting the worm gear teeth in the first place does not need to make such fine cuts, and therefore the worm gear may be finished in the rough in much less time. Consequently, instead of attempting to provide a single hob for accurately cutting the teeth of the worm gear in the first place and finishing them in oil with abrasive material, I provide two hobs, one of which is the usual form of cutting hob for cutting the teeth on a worm gear in the rough in a short time, and the other a finishing hob which will further cut the worm wheel teeth so as to produce an accurate mesh with the worm with which it is to coöperate, and avoid the necessity of operating the worm wheel with the worm in oil containing abrasive material.

It is the especial object of the invention to provide a hob having lateral cutting teeth or edges which may be arranged radially or spirally, although in some instances I make use of paper or cloth covered with an abrasive material, such as ground glass or emery and fastened to the lateral faces of the hob. I prefer, however, to cut the threads into the faces of the finishing hob either radially or scroll-like or file-like, or in any other manner, provided the cutting edges shall be rigid with the hob and of fixed dimensions so that they cannot be worn out of proper shape except after continued long use. I do not wish to be limited to the particular form of cutting hob shown, as various changes in the details might be made by those skilled in the art without departing from the spirit and scope of my invention as defined by the claims.

Although, as before stated, paper or cloth covered with abrasive material fastened to the faces of a worm to constitute a finishing hob is within the province of my invention, this is not the preferred form thereof, as the abrasive material soon wears off in parts and therefore the faces of the hob become irregular and do not finish the worm wheel or worm gear teeth to have accurately meshing surfaces or faces. However, by providing the lateral faces of the hob worm with cutting edges, which may in some instances be separately inserted so as to be rigid with the hob, but which are preferably integral with the hob, I produce a cutting tool which will retain its shape and thus properly finish the worm wheel or worm gear until the hob is to be sharpened or have its teeth reformed. Such cutting edges on the lateral faces of the hob worm may be radial, inclined, scroll-like, or made in any other desired manner, and of any convenient pitch or thickness. I prefer, however, to make spiral cutting teeth, varying from a long spiral to a radial tooth depending upon the rapidity with which the gear teeth are to be finished. I have found that spiral teeth having an angle from 60° to 90° give good results when hand power is used for rotating the hob and worm gear. Of course, the length of the spiral teeth and their pitch or width apart will vary with the work to be performed.

As seen in Figs. 1 and 1ᵃ, the teeth are substantially radial and are produced by means of a slotting tool. These teeth are right and left-handed, as indicated in Fig. 1ᵇ, as it is intended that only one side of the gear wheel teeth shall be finished at a time as hereinafter fully explained. In Figs. 2 and 2ᵃ the teeth are shown inclined and much closer together, indicating that they are more in the nature of file teeth, and are produced with a chisel. Figs. 3 and 3ᵃ show scroll cut teeth which are in the nature of involutes, and these teeth may be cut in any desired way, but I prefer to form them by means of a slotting tool or rotary cutter mounted on a stationary axis in a milling machine. The carrier of the hob is operated to move the hob longitudinally while at the same time rotating it and moving it sidewise so as to cause the tool to cut the groove as desired. As explained in my co-pending application for an improvement in the manufacture of worm wheel finishing hobs, filed October 22, 1908, Serial No. 458,989, the cutting of each tooth is begun at its outer end and continued to the inner peripheral surface of the hob. The hob is then returned to proper position and advanced so that the succeeding tooth may be cut in the same manner. After all the teeth have been cut on one lateral face of the finishing hob thread, the position of the hob is reversed and the teeth cut on the other lateral face of the finishing hob thread. It should also be noted that the teeth are cut right and left-handed on the respective lateral faces of the hob, so that when the finishing hob is rotated in one direction it will finish only one side of each tooth of the gear, and when rotated in the other direction will finish the other side of each gear tooth. The small cutting teeth on the lateral faces of the hob may be quite long or short, depending upon the degree of cutting desired per turn of the hob.

Figs. 4 and 4ᵃ indicate a hob having the lateral faces covered with paper or cloth which in turn is covered with an abrasive material, such as ground glass, or emery.

Fig. 5 represents a finishing hob 5 in position to finish the worm gear 6. By rotating the shaft 2 either by hand or by means of other power, such as a small electric motor, the worm hob will advance the worm gear against the resistance of the clamp 3. If this clamp is in the position shown and the shaft 2 is rotated anti-clockwise as viewed from the left in Fig. 1, the gear 6 will be rotated anti-clockwise against the resistance of the clamp 3. The cutting teeth 4 will each move upwardly over the surface 7 of the worm gear, and from the shape of the teeth as shown in Fig. 3ᵃ it is evident that this operation will effectively cut the lateral face of the worm gear teeth so as to have a true meshing surface. When the shaft 2 is rotated in the opposite direction, the surface 7' will be cut, but in such case a resistance device, herein shown as the clamp 3, will be placed diametrically opposite its position shown in Fig. 5.

Having thus fully described my invention, what I claim and desire to have protected by Letters Patent of the United States is:—

1. A hob provided with a helical thread shaped and adapted to mesh with a worm wheel, said thread having cutting means on a lateral face thereof.

2. A hob formed with a helical thread trapezoidal in cross section, said thread having cutting means on a lateral face thereof.

3. A hob formed with a worm shaped and adapted to mesh with the teeth of a worm wheel, said worm having file teeth formed on its lateral face.

4. A worm hob provided with a worm having scroll-cut teeth formed on the lateral faces of the worm.

5. A worm hob having a worm provided with cutting teeth extending spirally from the inner edges of the lateral faces of the worm to the outer edges thereof.

6. A worm hob shaped to mesh with the teeth of a worm wheel and provided with cutting teeth on its lateral faces, the teeth on one of the faces being cut right-handed and on the other left-handed.

7. A worm hob provided with a plurality of involute teeth on one of its lateral faces and a plurality of involute teeth on its other lateral face, the said teeth being cut different handed on the respective faces.

In testimony whereof I have signed my name to this specification in the presence of two subscribing witnesses.

ROBERT J. SMITH.

Witnesses:
EDWARD A. FITCH,
JOB FISH, Jr.